United States Patent [19]

Iinuma

[11] Patent Number: 4,475,127
[45] Date of Patent: Oct. 2, 1984

[54] SYSTEM FOR TRANSMITTING A VIDEO SIGNAL WITH SHORT RUNS AVOIDED IN A SIGNAL ENCODED FROM THE VIDEO SIGNAL

[75] Inventor: Kazumoto Iinuma, Tokyo, Japan

[73] Assignee: Nippon Electric Co., Ltd., Tokyo, Japan

[21] Appl. No.: 351,678

[22] Filed: Feb. 23, 1982

[30] Foreign Application Priority Data

Feb. 24, 1981 [JP] Japan .................................. 56-24836
Feb. 24, 1981 [JP] Japan .................................. 56-24837

[51] Int. Cl.³ .............................................. H04N 1/41
[52] U.S. Cl. .................................... 358/260; 358/261; 358/283
[58] Field of Search ................ 358/260, 261, 263, 283

[56] References Cited

U.S. PATENT DOCUMENTS 3,185,823  5/1965  Ellersick, Jr. et al. ............. 358/261
3,769,453  10/1973  Bahl et al. ............................ 358/261
4,193,096  3/1980  Stoffel .................................. 358/260
4,258,392  3/1981  Yamazaki et al. .................... 358/261

FOREIGN PATENT DOCUMENTS 56-7564  1/1981  Japan ................................... 358/260
1440378  6/1976  United Kingdom ................ 358/261

Primary Examiner—Joseph A. Orsino, Jr.
Attorney, Agent, or Firm—Sughrue, Mion, Zinn, Macpeak, and Seas

[57] ABSTRACT

In an encoder responsive to a video signal variable between high and low levels, a logic converter logically converts a succession of result signals, derived from the video signal by the use of a predetermined number of halftone threshold levels, into a sequence of converted signals having that run length of logic "0" or "1" level which is longer than that in the result signal succession. The converter may comprise a combination of adders and memory elements to process the consecutive result signals. The converted signal sequence is encoded by an encoding circuit into a data-compression digitized signal. In a decoder for decoding the digitized signal into a reproduction of the result signal succession, a logic inverter comprises a combination of adders and memory elements, similar to that of the converter. The inverter processes, into the reproduction, signals derived from data-expansion decoding of the digitized signal. Preferably, a dither matrix is used to provide the threshold levels.

6 Claims, 7 Drawing Figures

SYSTEM FOR TRANSMITTING A VIDEO SIGNAL WITH SHORT RUNS AVOIDED IN A SIGNAL ENCODED FROM THE VIDEO SIGNAL

BACKGROUND OF THE INVENTION

This invention relates to an encoder, a decoder, and a method for use in a digital communication system, such as a facsimile transmission system.

In a conventional digital communication system of the type described, a video signal is produced by scanning an item, such as a document, a sheet of drawing, or the like, and converted into a sequence of bits by sampling and analog-to-digital converting the video signal. The bit sequence is, thereafter, encoded into a data-compressed digitized signal consisting of a sequence of binary data so as to be transmitted on a transmission line.

A run-length encoding technique is well known in the art as such as data compression technique. With the run-length encoding technique, the bit sequence is resolved into a plurality of runs, each representative of a continuity of logic "1" levels or logic "0" levels, and is, thereafter, encoded into the digitized signal by measuring each run length.

If long run lengths consecutively appear in the bit sequence, the run-length encoding technique is very effective for the data compression (to be called a compression efficiency) because a total number of runs is remarkably reduced. As to a usual document or drawing, a high compression efficiency is accomplished by the use of the run-length encoding technique. This technique has, therefore, been adopted as an international standard for the facsimile transmission.

In the digital communication system, attempts have been made to transmit and reproduce halftone signals included in the video signal along with signals representative of a black and a white level. It is known in the art that such a halftone can be represented in the video signal by controlling a proportion between the black and the white levels.

A wide variety of dither methods has been proposed to control the proportion between the black and the white levels so as to represent the halftone in the video signal. In each dither method, the video signal has been converted into the bit sequence by the use of one or more dither matrices, each having a plurality of threshold levels which are called dither thresholds and which are intermediate between the black and the white levels of the video signal. The threshold levels are varied periodically in a predetermined order in any one of the dither methods.

As will later be described with reference to a few of several figures of the accompanying drawing, a great deal of runs, each of which has a short run length, inevitably appear in the digitized signal when the dither method is used in combination with the run-length encoding technique. The compression efficiency is, therefore, considerably reduced.

In "Proceeding of the S.I.D." Vol. 17/2 (1976), pp. 92-101, C. N. Judice proposed an ordered dither method wherein the bit sequence derived from the video signal by the use of the dither matrices is rearranged to create long runs of logic "1" levels or logic "0" levels and is, thereafter, encoded into the digitized signal with a data compression technique, such as run-length encoding technique.

With the ordered dither method, a wide memory capacity is indispensable to rearrange the bit sequence into a rearranged bit sequence. In addition, an intricate electronic circuit should be used to implement such an ordered dither method.

Alternatively, a halftone photography method may be used to reproduce the halftone in the facsimile system, instead of the dither methods. However, a lot of short run lengths inevitably take place in the digitized signal when the run-length coding technique is combined with the halftone photography method.

SUMMARY OF THE INVENTION

It is an object of this invention to provide a method and an encoder for encoding a video signal into a digitized signal, which prevents a lot of short runs from occurring in the digitized signal and which is capable of effectively carrying out data compression even when a halftone appears.

It is another object of this invention to provide an encoder of the type described, which is simple in structure and inexpensive.

It is still another object of this invention to provide a decoder for use in combination with an encoder of the type described, which serves to conveniently reproduce or reconstruct the halftone.

It is yet another object of this invention to provide a decoder of the type described, which is simple in structure and inexpensive.

A communication system according to this invention is for a video signal gradually variable between a high and a low level and comprises an encoder and a decoder. While gradually varying towards the high level, the video signal may or may not reach the high level before varying to the low level. This applies to the low level. The "gradual" variation may be discontinuous.

The encoder is for use in encoding the video signal into a data -compression digitized signal and comprises first means for generating over a preselected period threshold signals which successively and periodically take the valve, in a predetermined order, of a first predetermined number of halftone threshold levels predetermined between the high and the low levels, second means for comparing the video signal with the threshold signal to produce a succession of result signals, each representative of a predetermined one or the other of binary numbers "0" and "1", an even and an odd integer, respectively, when the video signal has a level higher and lower than each of the threshold levels, respectively, and third means for calculating the sum of the binary numbers representing, in said preselected period, the consecutive result signals, respectively, to produce a sequence of intermediate or converted signals with said consecutive result signals made to start at each result signal of said succession. Each of the intermediate signals has a first and a second level. The encoder further comprises fourth means for encoding the intermediate signal sequence into the digitized signal with data compression. The decoder is for use in combination with the encoder in decoding the digitized signal into a reproduction of the result signal succession and comprises decoding means for decoding with data expansion the digitized signal into a succession of transformed signals corresponding to the intermediate or converted signals of the encoder. The word transformed is used to describe the decoder signals in order to distinguish them from the intermediate signals produced by the encoder. Each of the transformed signals has either of the first and the second levels. Processing means is provided for processing the transformed signal succession into a succession of resulting signals, each being representative of either of said binary numbers. The binary numbers representing a particular resulting signal is dependent on a combination of the binary numbers representing the consecutive resulting signals, equal in number to the predetermined number less one, respectively, and of the level of a particular transformed signal. The particular resulting signal next succeeds the consecutive resulting signals in the resulting signal succession. The particular transformed signal and the successive resulting signals thereby are processed into the particular resulting signal. The resulting signal succession provides the reproduction of the result signal succession.

DESCRIPTION OF THE PREFERRED EMBODIMENTS

Figure 1:
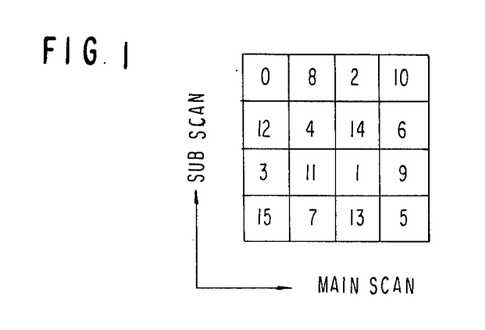
FIG. 1 is a diagram for describing a four-by-four dither matrix used in this invention.
Figure 2:
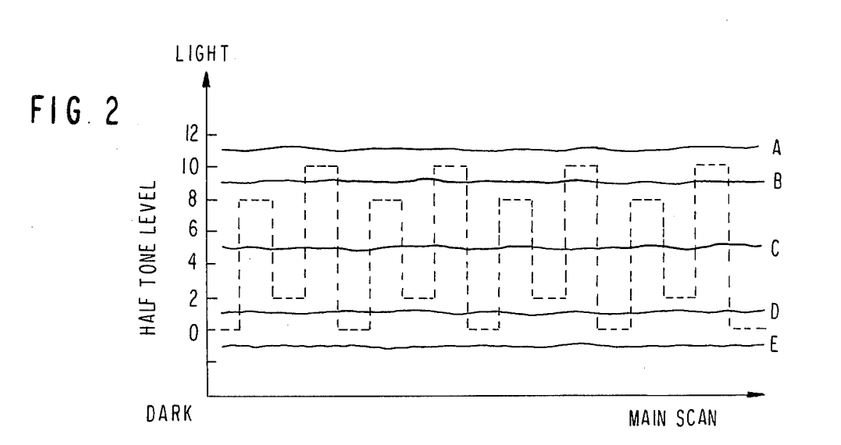
FIG. 2 shows several video signals for describing sampling operation carried out by the use of the dither matrix illustrated in FIG. 1.

Referring to FIGS. 1 and 2, an ordered dither method to which this invention is applicable will be described at first for a better understanding of this invention. The ordered dither method generally lends itself to reproduction of a halftone in a video signal gradually variable between a white and a black level.

A dither matrix is used in the ordered dither method to digitize the halftone. The dither matrix has a first predetermined number of threshold levels, namely, dither thresholds, predetermined between the white and the black levels, both exclusive. By way of example, a four-by-four dither matrix is exemplified in FIG. 1.

In FIG. 1, the four-by-four dither matrix has sixteen of the threshold levels which are represented by a sequence of numbers from "0" to "15". The first or uppermost row of the dither matrix may be assigned to a first scanning line of a main or horizontal scan for a while. Likewise, the second, the third, and the fourth rows of the dither matrix are assigned to a second, a third, and a fourth scanning line. As to the first row, the threshold levels are successively shifted from the left end of this figure to the right end in the order of "0," "8," "2," and "10." Thereafter, the threshold levels are repeated in the same order as "0," "8," "2," and "10" during the first scanning line. This means that the video signal is sampled and digitized during the first scanning line with reference to the threshold levels produced in the order of "0," "8," "2," and "10."

From this fact, it is readily understood that each threshold level in the first row appears at every fourth threshold level. Stated otherwise, a repetition cycle or period of the threshold levels is equal to four in the direction of the main scan.

After sampling is completed on the first scanning line, the dither matrix is switched from the first row thereof to the second row, namely, to the uppermost row but one. In other words, the matrix is shifted in rows by one in the direction of the subscan each time when sampling is completed on each scanning line.

As is the case with the first row, the threshold levels in the second row are successively and periodically produced in the order of "12," "4," "14," and "6" during sampling and digitizing the video signal on the second scanning line. Likewise, each of the threshold levels in the third row successively and periodically appears after production of the threshold levels in the second row and is followed by the threshold levels in the fourth row.

After the threshold levels in the fourth row are used to sample and digitize the video signal, each of the threshold levels in the first row is produced again during the fifth scanning line succeeding the fourth scanning line to sample and digitize the video signal. Thus, a repetition cycle, namely, period of the threshold levels is equal to four in the direction of the subscan. Similar operation is, thereafter, repeated two dimensionally.

At any rate, each of the threshold levels is dependent on a spatial portion of the video signal and may, therefore, be called a spatially dependent threshold level.

In FIG. 2, a halftone level indicative of an intensity of the halftone is represented by a numerical scale between "0" and "12," as shown along the ordinate of this figure. The halftone level of "0" is nearer to a dark or black level than the level of "12" which is adjacent to a light or white level. Although not explicitly illustrated in this figure, it is possible to calibrate the halftone level to the level of "15" when the dither matrix illustrated in FIG. 1 is used.

Five levels of the video signals, depicted at A, B, C, D, and E, are assumed to be sampled and digitized in the direction of the main scan (taken along the abscissa) by the use of the threshold levels in the first row of the matrix illustrated in FIG. 1. In this case, the threshold levels are varied with time in the direction of the main scan, as shown by a dashed polygonal line in FIG. 2.

As illustrated in FIG. 2, the video signal depicted at A exceeds in level the threshold level "10" and is, therefore, higher than all of the threshold levels in the first row of the matrix shown in FIG. 1.

Figure 3:
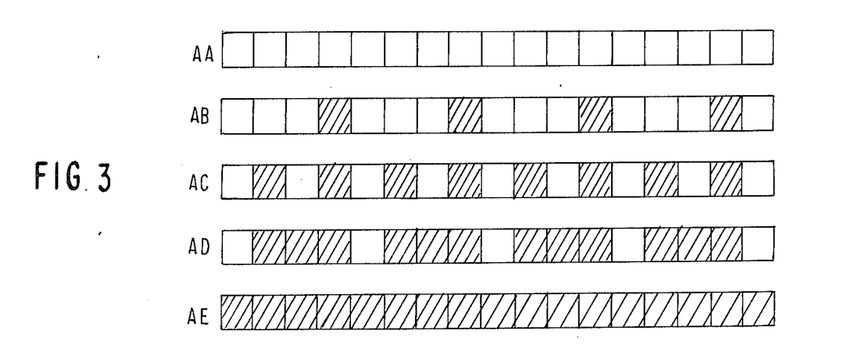
FIG. 3 shows several digital signals for illustrating level sequences produced by the sampling operation described with reference to FIG. 2.

Referring to FIG. 3, which has a time scale identical with FIG. 2, the video signal A is compared with all of the threshold levels in the first row and recognized as white, as depicted at AA. Thus, the video signal A is digitized into a succession of logic "0" levels which is produced as a succession of result signals representative of a result of comparison.

In FIG. 2, the video signal B is variable between the threshold levels "8" and "10." The video signal B is recognized as black only when the threshold level "10" appears, as depicted at AB in FIG. 3. As a result, the video signal B is sampled and digitized into a logic "1" level during production of the threshold level "10" and is, otherwise, digitized into the logic "0" level.

The video signal C illustrated in FIG. 2 has a level intermediate between the threshold levels "4" and "6." The video signal C is detected as black with respect to the threshold levels "8" and "10" and as white with respect to the threshold levels "0" and "2." As shown at AC in FIG. 3, the black levels alternatingly appear in correspondence to production of the threshold levels "8" and "10" and are digitized into the logic "1" level.

The video signal D between the threshold levels "0" and "2" is detected as white in a similar manner only during production of the threshold levels "0," as illustrated at AD in FIG. 3.

The video signal E lower than the threshold level "0" is recognized as black with respect to all of the threshold levels "0," "8," "2," and "10," as shown at AE in FIG. 3 and is digitized into a continuous sequence of the logic "1" level.

As readily understood from AA and AE, long run lengths of the logic "0" or the logic "1" level are produced when the hafltone levels are high or low enough. However, the run lengths become very short when halftone levels, such as B, C, and D, are sampled and digitized by the use of the dither matrix. As a result, the compression efficiency becomes objectionally low when a sequence of result signals, such as AB, AC, or AD, is subjected to data compression by the use of the run-length encoding technique, as pointed out in the preamble of the instant specification.

Figure 4:
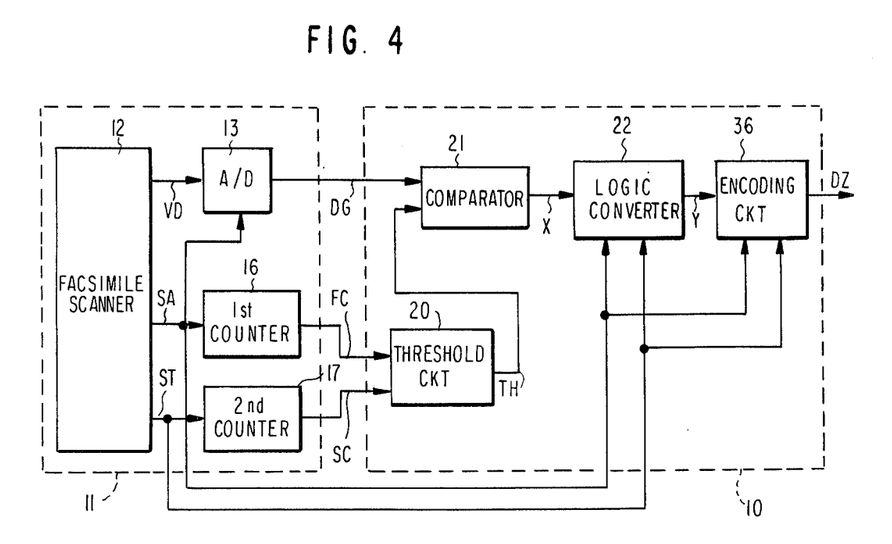
FIG. 4 shows a block diagram of an encoder according to a preferred embodiment of this invention along with a signal producing circuit.

Referring to FIG. 4, an encoder 10 according to a preferred embodiment of this invention is for use in combination with a signal producing circuit 11 well known in the art and with the four-by-four dither matrix illustrated in FIG. 4. The signal producing circuit 11 comprises a facsimile scanner 12 for scanning an item, such as a document, a drawing, or the like, by successive main scans to produce an analog video signal VD gradually variable between the white or high level and the low or black level, both inclusive. Along with the analog video signal VD, the scanner 12 produces a start signal ST indicative of the beginning of each main scan and a plurality of sampling pulses SA of a predetermined repetition frequency such as 500 kHz. Thus, the video signal VD is accompanied by the start signals ST and the sampling pulses SA. Although the start signals ST and the sampling pulses SA are produced independently of the video signal VD, they may be included in the video signal VD.

The signal producing circuit 11 comprises an analog-to-digital converter 13 for converting the analog video signal VD into a digtital video signal DG in response to the sampling pulses SA. Responsive to the sampling pulses SA, a first counter 16 repeatedly counts the sampling pulses SA to a first preselected count to produce a first count signal FC representative of the count variable each time when the sampling pulses SA are counted by the first counter 16. The first preselected count is equal to four when the four-by-four dither matrix is used. The first counter 16 successively indicates the positions of the video signal VD along the main scan to repeatedly select the threshold levels in each row of the dither matrix.

The signal producing circuit 11 further comprises a second counter 17 for repeatedly counting each start signal ST to a second preselected count to produce a second count signal SC representative of the count variable each time when each start signal ST is counted. The second preselected count is also equal to four in this signal producing circuit 11. The second counter 17 serves to repeatedly indicate each scanning line along the subscan.

The encoder 10 illustrated in FIG. 4 comprises a threshold circuit 20 known in the art and responsive to the first and the second count signals FC and SC for producing a threshold signal TH. More particularly, the threshold circuit 20 may comprise a read only memory having addresses, sixteen in number, for storing each of the threshold levels "0" through "15" in the form of digital signals and an address selector responsive to the first and the second count signals FC and SC for selecting one of the addresses in accordance with a combination of the first and the second count signals FC and SC.

Consequently, the threshold signal TH successively and periodically takes, in a predetermined order, a first predetermined number of the threshold levels that is equal to sixteen in the illustrated encoder 10. The half-tone threshold levels are predetermined between the white and the black levels, as illustrated with reference to FIG. 2. The predetermined order is determined in a manner similar to that described in conjunction with FIG. 1.

The threshold signal TH is supplied in a digital fashion to a comparator 21 together with the digital video signal DG produced by the analog-to-digital converter 13. The comparator 21 compares the digital video signal DG with the threshold signal TH to produce a succession of result or digital signals X synchronized with the sampling pulses SA. The result signals and the result signal succession will be represented by an identical reference symbol X so long as confusion is not introduced.

As described in conjunction with FIGS. 2 and 3, each of the result signals X is representative of a result of comparison and takes either the logic "0" level or the logic "1" level. Without loss of generality, the logic "0" and the logic "1" levels may be assumed to be an even and an odd integer, respectively. In the illustrated encoder 10, each of the result signals X takes the even and the odd integers when the digital video signal DG has a level higher and lower than each of the threshold levels, respectively. However, the even and the odd integers may be reversely produced relative to each of the halftone threshold levels.

In FIG. 4, the encoder 10 comprises a logic converter 22 responsive to the result signal succession X, the start signals ST, and the sampling pulses SA for logically converting the result signal succession X into a sequence of intermediate or converted signals Y in a manner to be described later in more detail. The logic converter 22 serves to calculate a result of addition of the integers represented by a second predetermined number of the consecutive or successive result signals, respectively. The second predetermined number is representative of the repetition cycle repeated in the direction of the main scan, as described with reference to FIG. 1, and is therefore equal to four as long as the encoder 10 is concerned. The consecutive result signals are made to start at each result signal of the succession and the second predetermined number of four is successively counted initially from every one of the result signals X.

Figure 5:
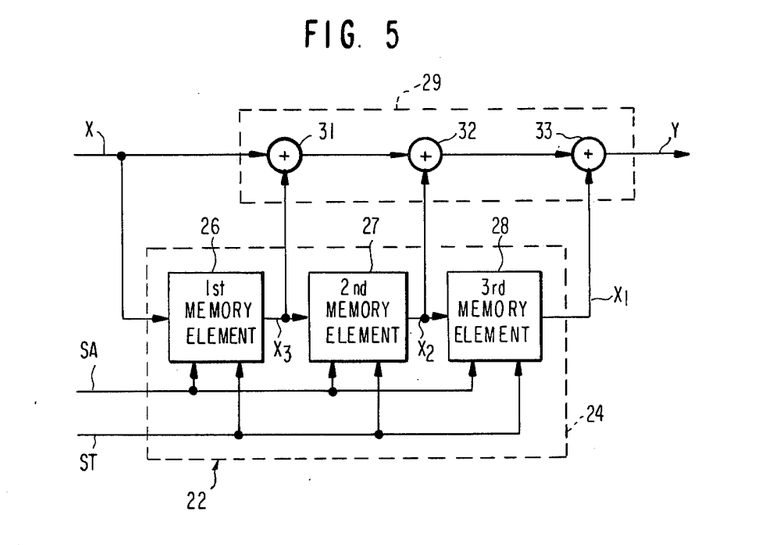
FIG. 5 is a block diagram of a logic converter used in the encoder illustrated in FIG. 4.

Turning to FIG. 5, the logic converter 22 comprises a storing circuit 24 responsive to the result signal succession X for storing a plurality of the result signals, equal in number to the second predetermined number less one, namely, three in the case being illustrated. For this purpose, the storing circuit 24 comprises a plurality of encoder memory elements or registers, equal in number to three. The registers are cascaded from a first register 26 through a second register 27 to a third or last register 28. The registers 26 through 28 are reset in response to the start signal ST to store the logic "0" levels, respectively. Subsequently, the result signal succession X is supplied to the first register 26. The result signals are successively stored in the registers as the stored result signals in accordance with the sampling pulses SA. At the same time, the stored result signals are moved from the first register 26 towards the last register 28. Furthermore, the stored result signals are concurrently produced from the respective registers 26, 27, and 28 as parallel register output signals.

For convenience of description, the parallel register output signals in the last register 28 back to the first register 26 are designated by $X_1$, $X_2$, and $X_3$, respectively. The register output signals are thus designated in the order of the succession. Thus, the latest result signal is stored in the first register 26 to produce one of the parallel register output signals.

Further referring to FIG. 5, the logic converter 22 comprises an adder circuit 29 responsive to the parallel register output signals $X_1$, $X_2$, and $X_3$ and the result signal succession X. The adder circuit comprises a plurality of encoder adder elements 31, 32, and 33 for carrying out addition modulo two. In other words, each encoder adder element is implemented by an Exclusive OR gate. The encoder adder elements 31, 32, and 33 are connected in cascade in one-to-one correspondence to the registers 26, 27, and 28 and may be called first, second, and third adder elements.

In FIG. 5, the result signal succession X is supplied to the first adder element 31 corresponding to the first register 26. On the other hand, the parallel register output signals $X_3$, $X_2$, and $X_1$ are supplied from the first through third registers 26 through 28 to the corresponding adder elements 31 through 33, respectively. As a result, the adder circuit 29 adds the integers represented by the parallel register output signals $X_3$, $X_2$, and $X_1$, respectively, to the integer represented by a particular one of the result signals that next succeeds in the succession the result signals stored in the registers 26 through 38. Thus, the particular result signal following the stored result signal $X_3$ is added to three of the preceding result signals $X_1$, $X_2$, and $X_3$ by the first through third adder elements 31 through 33 to calculate the result of addition of the integers represented by four consecutive result signals.

The result of the addition is derived as one of the intermediate signal sequence Y from the third adder element 33. Each of the intermediate signals has a first level, namely, logic "0" level and a second level, namely, logic "1" level representative of the even and the odd integers, respectively, when the result of addition is even and odd, respectively.

Although the second predetermined number is smaller than the first predetermined number in the illustrated encoder 10, the second predetermined number may be equal to the first predetermined number.

Figure 6:
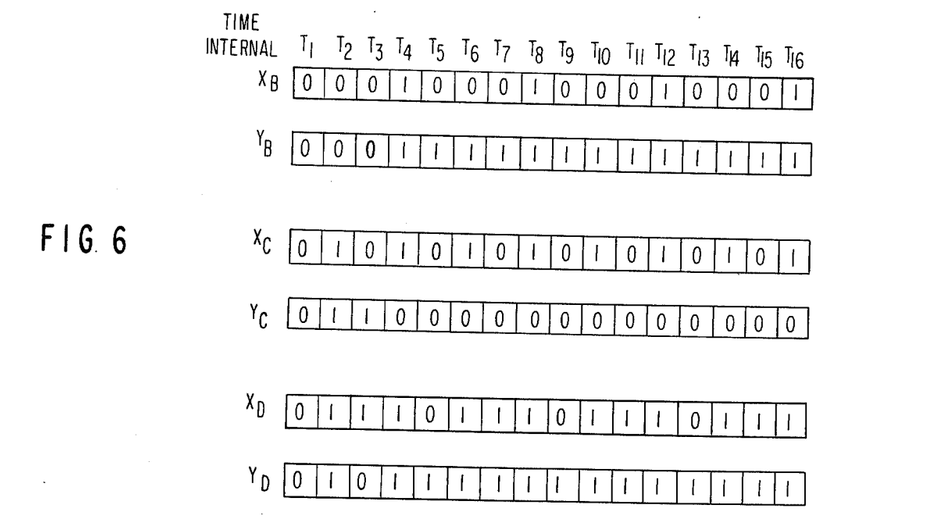
FIG. 6 is a timing chart for describing operation of the logic converter illustrated in FIG. 5.

Referring to FIG. 6 together with FIG. 5, operation of the logic converter 22 will be described more in detail. In FIG. 6, first through sixteenth sampling time intervals between the sampling pulses are indicated by $T_1$, $T_2$, ..., and $T_{16}$. Result signal successions depicted at $X_B$, $X_C$, and $X_D$ are equivalent to white-and-black level sequences illustrated at AB, AC, and AD in FIG. 3, respectively. Each result signal succession is exemplified by sixteen bits, each of which is specified by either the logic "0" level or the logic "1" level and which are allotted to the respective sampling time intervals $T_1$, $T_2$, ..., and $T_{16}$. The logic converter 22 is for converting the result signal successions $X_B$, $X_C$, and $X_D$ into intermediate signal sequences depicted at $Y_B$, $Y_C$, and $Y_D$, respectively.

Consideration is directed to a case where the result signal succession $X_B$ is converted into the intermediate signal sequence $Y_B$. The registers 26, 27, and 28 are reset into an initial state in response to the start signal ST to concurrently produce the logic "0" levels as the parallel register output signals $X_3$, $X_2$, and $X_1$. The sequence of the logic "0" levels appearing at the initial state may be considered as a part of the result signal succession.

When the first one of the result signals X is given to the first adder element 31 during the initial state, a first one of the intermediate signals Y is represented by:

$$Y = X \oplus X_3 \oplus X_2 \oplus X_1, \tag{1}$$

where an encircled plus signal is representative of addition modulo two, namely, the Exclusive OR. From Equation (1), it appears that the first result signal (X) is equal to the first intermediate signal (Y) because all of the parallel register output signals $X_3$, $X_2$, and $X_1$ take the logic "0" levels. As to the result signal succession $X_B$, the first result signal (X), which takes the logic "0" level, namely, the even integer, appears as the first intermediate signal (Y) with the integer represented by the first result signal (X) kept intact. Therefore, the first intermediate signal (Y) takes the logic "0" level in the first sampling time interval $T_1$. Similarly, the second and the third ones of the intermediate signals (Y) takes the logic "0" levels in the second and the third sampling time intervals $T_2$ and $T_3$ because the odd integer or logic "1" level does not appear in the result signals during the second and the third sampling time intervals $T_2$ and $T_3$. During the fourth sampling time interval $T_4$, the result signal (X) takes the odd integer or logic "1" level while all of the parallel register output signals $X_3$, $X_2$, and $X_1$ take the logic "0" levels. Under these circumstances, the intermediate signal (Y) takes the logic "1" level, as readily understood from Equation (1). In other words, a result of addition of the integers represented by the result signals in the first through fourth time intervals is equal to unity, which is an odd integer. Therefore, the level represented by the intermediate signal in the fourth sampling time interval $T_4$ takes the second or logic "1" level. In the fifth sampling time interval, the level represented by the intermediate signal is equal to the logic "1" level because the result of addition of the integers represented by the successive result signals is equal to the odd integer or unity. Likewise, the intermediate signals take the logic "1" levels from the sixth sampling time interval $T_6$ to the sixteenth sampling time interval $T_{16}$. Thus, the logic "1" level continuously appears as long as the result signals $X_B$ vary with the cycle equal to four, as illustrated at $X_B$ in FIG. 6.

Thus, the intermediate signal sequence $Y_B$ has a long run length of the logic "1" level after the fourth sampling time interval.

The result signal successions $X_C$ and $X_D$ are converted into the intermediate signal sequences $Y_C$ and $Y_D$, respectively, in a similar manner. The intermediate signal sequence $Y_C$ takes the logic "1" level only in the second and third sampling time intervals $T_2$ and $T_3$ while the intermediate signal sequence $Y_D$ takes the logic "0" level only in the first and the third sampling time intervals $T_1$ and $T_3$.

At any rate, each of the intermediate signals Y continuously takes the logic "0" level, when the result signals consecutively take either the logic "0" levels or the logic "1" levels. As long as the result signal succession is periodically variable with the cycle equal to four, as shown at $X_B$, $X_C$, and $X_D$, the converted or intermediate signals consecutively take either the logic "0" levels or the logic "1" levels.

Turning back to FIG. 4, the intermediate signal sequence Y is supplied to a compression encoder 36 for encoding the intermediate signal sequence into the digitized signal with data compression. The compression encoder may be a run-length encoder well known in the art.

It is possible for the run-length encoder to compress the intermediate signal sequence into the digitized signal DZ with a high compression efficiency because the intermediate signal sequence has long run lengths as described with reference to FIG. 6. In the run-length encoder, application is possible of either of a modified Huffman encoding technique and a modified READ encoding technique, both being well known in the art.

According to a result of computer simulation using a predetermined image which needs 529, 531 bits without the logic converter 22, it has been confirmed that an amount of bits is reduced to 139, 198 bits with the logic converter 22.

Figure 7:
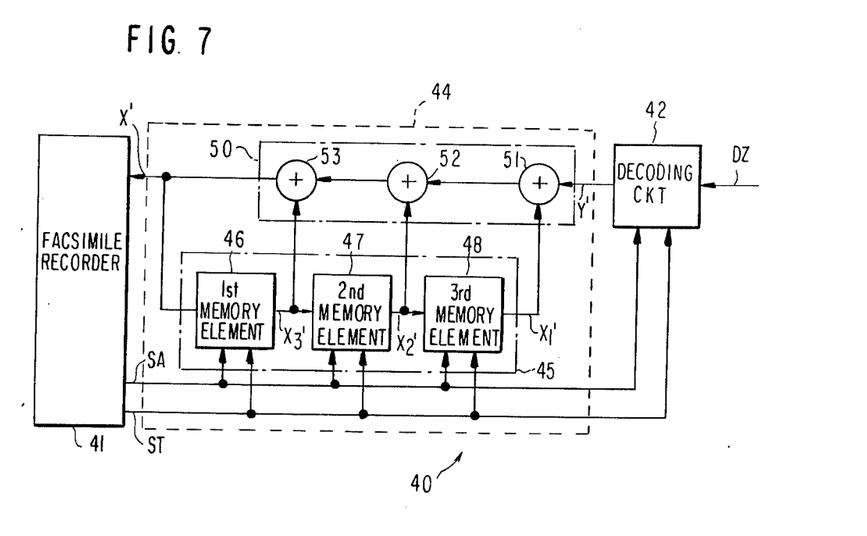
FIG. 7 shows a block diagram of a decoder according to another embodiment of this invention, which is for use in combination with the encoder illustrated in FIG. 4.

Referring to FIG. 7, a decoder 40 according to another embodiment of this invention is for use in combination with the encoder illustrated with reference to FIGS. 4 through 6 to decode the digitized signal DZ into a reproduction of the result signal succession X'. In practice, the decoder 40 is combined with a known facsimile recorder 41 for decoding the result signal succession reproduction X' into a decoded video signal to record the decoded video signal on a pertinent medium. The facsimile recorder 41 produces a start signal ST representative of the beginning of each scan and a plurality of sampling pulses SA as usual. During transmission from the encoder 10, the digitized signal DZ may be supplied to the decoder 40 with a little change.

The decoder 40 comprises a decoding circuit 42 for decoding with data expansion the digitized signal DZ into a succession of transformed signals depicted by Y', each having either of the first level and the second level which correspond to the logic "0" level and the logic "1" level, respectively. The transformed signal succession Y' is to be identical with the intermediate signal sequence Y unless errors take place during transmission. The decoding circuit 42 may be a run-length decoder for decoding the modified Huffman code, the modified READ code, or the like. The decoding circuit 42 comprises a memory (not shown) for storing the digitized signal to produce the stored digitized signal in response to the start signals ST and the sampling pulses SA, both being supplied from the facsimile recorder 41.

The decoder 40 further comprises a signal processing circuit or logic inverter 44 for processing the transformed signal succession Y' into a succession of resulting signals X'. The resulting signal succession X' provides the reproduction of the result signal succession X in a normal state. Like in each of the result signals X, each of the resulting signals X' is representative of either of the even and the odd integers which correspond to the logic "0" and the logic "1" levels, respectively. The even and the odd integers may be considered as the logic "0" level and the logic "1" level in this decoder 40.

For convenience of description, consideration is given to a particular resulting signal (X') next following the consecutive resulting signals, equal in number to the second predetermined number less one, namely, three. The integer represented by the particular resulting signal (X') is dependent on a combination of the intergers represented by the consecutive resulting signals and of the level of a particular transformed signal (Y') arrived at the circuit 44 on production of the particular resulting signal (X').

Briefly, the signal processing circuit 44 serves to process the consecutive resulting signals and the particular transformed signal (Y') into the particular resulting signal (X'). More particularly, the signal processing circuit 44 comprises a storage or retaining portion 45 for retaining the consecutive resulting signals to concurrently produce the retained resulting signals as parallel storage output signals to be presently described in detail. The storage portion 45 comprises a plurality of decoder memory elements which are equal in number to the second predetermined number less one, namely, three, and which are simultaneously reset in response to the start signal ST. The decoder memory elements are connected in cascade from a first decoder memory element 46 through a second decoder memory element 47 to a third or last decoder memory element 48. A succession of input signals to be described later is supplied to the first decoder memory element 46. The input signals are stored in the decoder memory elements in synchronism with the sampling pulses SA, with the stored input signals moved from the first decoder memory element 46 towards the last decoder memory elements 48. The input signals stored in the respective decoder memory elements 46 through 48 are concurrently produced as the parallel storage output signals. The parallel storage output signals from the last decoder memory element 48 back to the first decoder memory element 46 will be represented by $X_1'$, $X_2'$, and $X_3'$. The suffixes are attached to the respective output signals in sequence of time, like in the logic converter 22 illustrated in FIG. 5. It should be noted here that the parallel storage output signals $X_3'$, $X_2'$ correspond to the parallel register output signals $X_3$, $X_2$, and $X_1$, respectively.

Coupled to the storage portion 45, a sum circuit 50 is for calculating a sum of the integers represented by the parallel output signals $X_3'$, $X_2'$ and $X_1'$, respectively, and the integer represented by the level of the particular transformed signal Y'. The sum circuit 50 comprises a plurality of decoder adder elements 51, 52, and 53 for carrying out addition modulo two. The decoder adder elements 51, 52, and 53 are connected in cascade in one-to-one correspondence to the decoder memory elements 46, 47, and 48. Hence, the decoder adder elements 51, 52, and 53 are equal in number to the decoder memory elements 46, 47, and 48. The intermediary memory signal succession Y' is supplied to the decoder adder element 51 corresponding to the third decoder memory element 48. The parallel output signals $X_3'$, $X_2'$, and $X_1'$ are supplied to the corresponding decoder adder elements 51, 52, and 53, respectively. The first decoder memory element 46 is supplied, as each of the input signals, with an adder output signal representative of a sum calculated by the decoder adder elements 51, 52, and 53. A sequence of such adder output signals are sent to the facsimile recorder 41 as the resulting signal succession X' and to the first decoder memory element 46 as the above-mentioned succession of input signals.

The signal processing circuit 44, which may be called a logic inverter, produces the resulting signal succession providing the reproduction of the result signal succession X illustrated with reference to FIGS. 4 through 6, as will be described below. For brevity of description, the transformed signal succession Y' is assumed to be identical with the intermediate signal sequence Y produced by the encoder. Therefore, a prime (') will be omitted from the transformed signals and their succession hereinafter.

It is surmised that the signal processing circuit 44 is supplied as the transformed signal succession with the intermediate signal sequence $Y_B$ illustrated in FIG. 6 and that the first through third decoder memory elements, namely, decoder registers 46 through 48 are reset by the start signal ST into an initial state.

When a first one of the transformed signals Y is given to the signal processing circuit 44, a first one of the resulting signals X' is represented by:

$$X' = Y \oplus X_3' \oplus X_2' \oplus X_1'. \quad (2)$$

Inasmuch as the parallel storage output signals $X_3'$, $X_2'$, and $X_1'$ take the logic "0" levels on the above-mentioned assumption, the first resulting signal X' is given by: X' = Y. As readily understood from FIGS. 4 and 6, the integer represented by the first resulting signal X' is equal to the integer represented by the first one of the result signals X.

The first resulting signal X' is stored as the input signal in the first decoder memory element 46 in response to one of the sampling pulses SA. Thereafter, similar operation is carried out as to the transformed signal succession $Y_B$ with the stored input signals moved from the first decoder memory element 46 towards the third decoder memory element 48 in accordance with the sampling pulses SA.

When the resulting signals X' are coincident with the result signals X in the first through third time intervals $T_1$ through $T_3$ shown in FIG. 6, the parallel storage output signals $X_3'$, $X_2'$, and $X_1'$ in the first through third decoder registers 46, 47, and 48 are to be equal to the parallel register output signals $X_3$, $X_2$, and $X_1$ in the first through third encoder registers 26, 27, and 28, respectively. Accordingly, the parallel storage output signals $X_1'$, $X_2'$, and $X_3'$ are given by: $X_1' = X_1$, $X_2' = X_2$, and $X_3' = X_3$.

The fourth or particular resulting signal X' next succeeding three of the resulting signals is dependent on a combination of the encoder parallel output signals $X_1$, $X_2$, and $X_3$ with the intermediary signal Y and is represented by:

$$X' = Y \oplus X_3 \oplus X_2 \oplus X_1. \quad (3)$$

Substituting Equation (1) into Equation (3), the following equation results:

$$X' = X \oplus X_3 \oplus X_2 \oplus X_1 \oplus X_3 \oplus X_2 \oplus X_1, \quad (4)$$
$$= X.$$

Equation (4) holds not only in the intermediary signal succession $Y_B$ but also in the other intermediary signal successions $Y_C$ and $Y_D$.

Accordingly, it is readily understood that the resulting signal succession X' is equivalent to the result signal sequence X. This means that the digitized signal DZ is desirably decoded into the resulting signal succession X'.

While this invention has thus far been described in conjunction with a few embodiments thereof, it is readily possible for those skilled in the art to practice this invention in various manners. For example, a wide variety of dither matrices, such as a sixteen-by-sixteen dither matrix or the like, may be used to sample the video signal. A known halftone photography method, which uses a plurality of halftone threshold levels, is applicable instead of the dither method. In FIG. 4, the comparator 21 may be supplied with an analog video signal and an analog threshold signal to carry out comparison in an analog fashion. The encoder adder elements 31 through 33 illustrated in FIG. 5 may be substituted by a combination of a counter and a detector for detecting the even and the odd integers. In FIG. 7, the start and the sampling signals ST and SA may be produced by any other circuits than the facsimile recorder 41.

What is claimed is:

1. A method of encoding a video signal gradually variable between a high and a low level into a data-compression digitized signal, comprising the steps of:
generating a plurality of threshold signals which in a preselected period successively take the values of a first predetermined number of halftone threshold levels, and halftone threshold levels being predetermined between said high and said low levels;
comparing said video signal with said theshold signals to produce a succession of result signals, each representative of a predetermined one or the other of the binary members "0" and "1", when said video signal has a level higher and lower than each of said threshold levels, respectively;
calculating for each result signal the sum of the binary numbers representing the consecutive result signals occurring during said preselected period, the consecutive result signals being formed from the result signal and the immediately preceding result signals equal in number to one less than the number of result signals occurring during the preselected period, to produce a sequence of converted signals, each of said converted signals having a first or a second level when said sum is equal to an even or odd integer, respectively, said predetermined number of the consecutive result signals lasting said preselected period; and
encoding said converted signal sequence into said digitized signal with data compression.

2. An encoder for encoding a video signal gradually variable between a high and a low level, both inclusive, into a data-compression digitized signal, comprising:
first means for generating a plurality of threshold signals which in a preselected period, successively take the values of a first predetermined number of halftone threshold levels, said halftone threshold levels being predetermined between said high and said low levels;
second means for comparing said video signal with said threshold signal to produce a succession of result signals, each representative of a predetermined one or the other of binary numbers "0" and "1", when said video signal has a level higher and lower than each of said theshold levels, respectively;
third means for calculating for each result signal the sum of the binary numbers representing, in said preselected period, the consecutive result signals, the consecutive result signals being formed from the result signal and the immediately preceding result signals equal in number to one less than the number of result signals occurring during the preselected period, to produce a sequence of converted signals, each of said converted signals having a first or a second level when said sum is equal to even or odd integers, respectively, said predetermined number of the consecutive result signals lasting said preselected period; and fourth means for encoding said converted signal sequence into said digitized signal with data compression.

3. An encoder as claimed in claim 2, wherein said third means comprises:

storing means responsive to said succession of result signals for storing a plurality of the result signals, equal in number to said predetermined number less one, to concurrently produce the stored result signals as parallel storing means output signals, respectively; and adder means responsive to said parallel storing means output signals and said result signal succession for adding the binary numbers represented by said parallel storing means output signals, respectively, and the binary number represented by one of said result signals that next succeeds in said succession the result signals stored in said storing means, said adder means thereby producing said converted signal sequence.

4. An encoder as claimed in claim 3, said video signal being produced by successive scans to be accompanied by a start signal at the beginning of each scan and by a plurality of sampling pulses of a predetermined repetition frequency, said second means being responsive to said sampling pulses to produce said result signals in accordance with said sampling pulses, wherein:

said storing means comprises:
a plurality of encoder memory elements, equal in number to said second predetermined number less one, said encoder memory elements being cascaded from a first encoder memory element to a last encoder memory element;
means responsive to said start signal for resetting said encoder memory elements;
means for supplying said result signal succession to said first encoder memory element;
means responsive to each sampling pulse for storing the result signals in said encoder memory elements, respectively, with the stored result signals moved from said first encoder element towards said last encoder memory element, and for making said encoder memory elements produce said parallel storing means output signals, respectively;
said adder means comprising:
a plurality of encoder adder elements for carrying out addition modulo two;
means for supplying said result signal succession to the encoder adder element;
means for supplying said parallel storing means output signals to said encoder adder elements; and
means for deriving said converted signal sequence from the encoder adder element.

5. A decoder for use in combination with the encoder of claim 2 in decoding said digitized signal into a reproduction of said result signal succession, comprising:

decoding means for decoding with data expansion said digitized signal into a succession of transformed signals, each having either of said first and said second levels; and processing means for processing said transformed signal succession into a succession of resulting signals, each being representative of either of said binary numbers;

said processing means comprising:
retaining means for retaining consecutive ones of said resulting signals that are equal in number to said predetermined number less one, to concurrently produce the retained resulting signals as parallel retaining means output signals, respectively;
sum calculating means for calculating a sum of the binary numbers represented by said parallel retaining means output signals, respectively, and the binary number represented by the level of a particular transformed signal in said transformed signal succession to produce a particular resulting signal representative of said binary numbers of "0" and "1" when said sum is even and odd, respectively, said particular resulting signal next succeeding said consecutive resulting signals; and
means for providing said particular resulting signal as said reproduction of the result signal succession.

6. A decoder as claimed in claim 5, wherein:
said retaining means comprises:
a plurality of decoder memory elements, equal in number to said predetermined number less one, said decoder memory elements being connected in cascade from a first decoder memory element to a last decoder memory element;
means for supplying a succession of input signals to said first decoder memory element; and
means for storing the input signals in said decoder memory elements, respectively, with the stored input signals moved from said first decoder memory element towards said last decoder memory elements, said decoder memory elements concurrently producing the input signals stored in the respective decoder memory elements as said parallel retaining means output signals, respectively;
said sum calculating means comprising:
a plurality of decoder adder elements for carrying out addition modulo two;
means for supplying said transformed signal succession to the decoder adder elements;
means for supplying said parallel decoder memory element output signals to said decoder adder elements: and
means for supplying said first encoder memory element, as each of said input signals, with an adder output signal representative of a sum calculated by said decoder adder elements, a sequence of such adder output signals providing said resulting signal succession.

* * * * *

UNITED STATES PATENT AND TRADEMARK OFFICE
CERTIFICATE OF CORRECTION

PATENT NO. : 4,475,127
DATED : October 2, 1984
INVENTOR(S) : Kazumoto IINUMA

It is certified that error appears in the above-identified patent and that said Letters Patent is hereby corrected as shown below:

Column 1, line 20, delete "as" (second occurrence) and insert therefor --a--;

Column 2, line 41, delete "valve" and insert therefor --values--;

Column 7, line 41, delete "38" and insert therefor --28--;

Column 10, line 42, after "$X_2'$" insert --$X_1'$--;

Column 10, line 56, delete "intermediary" and insert therefor --transformed--;

Column 12, line 28, delete "and" and insert therefor --said--;

Column 12, line 33, delete "members" and insert therefor --numbers--;

Column 13, line 53, after "encoder" insert --memory--;

Column 14, line 56, delete ":" and insert therefor --;--;

UNITED STATES PATENT AND TRADEMARK OFFICE
CERTIFICATE OF CORRECTION

PATENT NO. : 4,475,127

DATED : October 2, 1984

INVENTOR(S) : Kazumoto IINUMA

It is certified that error appears in the above-identified patent and that said Letters Patent is hereby corrected as shown below:

Column 14, line 57, delete "encoder" and insert therefor --decoder--.

*Signed and Sealed this*

*Twenty-fourth* Day of *September 1985*

[SEAL]

*Attest:*

*Attesting Officer*

DONALD J. QUIGG

*Commissioner of Patents and Trademarks—Designate*